United States Patent
Hagimoto et al.

(10) Patent No.: US 9,835,069 B2
(45) Date of Patent: Dec. 5, 2017

(54) EXHAUST GAS PURIFICATION SYSTEM FOR AN INTERNAL COMBUSTION ENGINE

(71) Applicant: TOYOTA JIDOSHA KABUSHIKI KAISHA, Toyota-shi, Aichi-ken (JP)

(72) Inventors: Yuriko Hagimoto, Susono (JP); Takeru Shirasawa, Susono (JP); Ryohei Ono, Susono (JP); Kenji Furui, Sunto-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/377,328

(22) Filed: Dec. 13, 2016

(65) Prior Publication Data

US 2017/0175605 A1    Jun. 22, 2017

(30) Foreign Application Priority Data

Dec. 17, 2015  (JP) ................................ 2015-246495

(51) Int. Cl.
*F01N 3/20* (2006.01)
*B01D 53/94* (2006.01)
(Continued)

(52) U.S. Cl.
CPC ......... *F01N 3/208* (2013.01); *B01D 46/0027* (2013.01); *B01D 53/9418* (2013.01);
(Continued)

(58) Field of Classification Search
None
See application file for complete search history.

(56) References Cited

U.S. PATENT DOCUMENTS

2010/0319324 A1*  12/2010  Mital ..................... F01N 3/021
                                                         60/286

FOREIGN PATENT DOCUMENTS

| JP | 2001-193440 | 7/2001 |
|----|----|----|
| JP | 2009-293606 | 12/2009 |
| JP | 2009293606 A * | 12/2009 |

OTHER PUBLICATIONS

Matsui, Y. JP2009293606A—translated document. (2009).*
(Continued)

*Primary Examiner* — Walter D Griffin
*Assistant Examiner* — Jelitza Perez
(74) *Attorney, Agent, or Firm* — Finnegan, Henderson, Farabow, Garrett & Dunner, LLP

(57) ABSTRACT

An object of the disclosure is to adjust the ammonia adsorption amount in an SCR catalyst supported on an SCR filter as close as possible to a target adsorption amount in an exhaust gas purification system including the SCR filter. In a system according to the disclosure, the quantity of ammonia supplied by an ammonia supplier is made smaller when a differential pressure change rate at the time when ammonia is supplied by the ammonia supplier is lower than a predetermined threshold than when the differential pressure change rate at the time when ammonia is supplied by the ammonia supplier is equal to or higher than the predetermined threshold. Moreover, when the differential pressure change rate is lower than the predetermined threshold, the change in the quantity of ammonia supplied by the ammonia supplier relative to the change in the filter PM deposition amount is kept equal to zero.

1 Claim, 7 Drawing Sheets

(51) Int. Cl.
*B01D 46/00* (2006.01)
*F01N 3/035* (2006.01)
*F01N 11/00* (2006.01)

(52) U.S. Cl.
CPC ......... *B01D 53/9495* (2013.01); *F01N 3/035* (2013.01); *F01N 11/002* (2013.01); *B01D 2279/30* (2013.01); *F01N 2240/25* (2013.01); *F01N 2510/06* (2013.01); *F01N 2610/02* (2013.01); *F01N 2900/1406* (2013.01)

(56) References Cited

OTHER PUBLICATIONS

F. Schrade et al., "Physico-Chemical Modeling of an Integrated SCR on DPF (SCR/DPF) System", SAE International Journal of Engines, vol. 5, No. 3, pp. 958-974 (Aug. 2012).

* cited by examiner

EXHAUST GAS PURIFICATION SYSTEM FOR AN INTERNAL COMBUSTION ENGINE

This application claims the benefit of Japanese Patent Application No. 2015-246495, filed on Dec. 17, 2015, which is hereby incorporated by reference herein in its entirety.

TECHNICAL FIELD

The present disclosure relates to an exhaust gas purification system for an internal combustion engine equipped with an SCR filter provided in an exhaust passage of the internal combustion engine.

BACKGROUND ART

It is known in prior art to provide an SCR filter made up of a filter and an SCR catalyst (selective catalytic reduction NOx catalyst) supported on the filter in an exhaust passage of an internal combustion engine. The SCR filter has a capability of reducing NOx in the exhaust gas by using ammonia as reducing agent. The filter has the function of trapping particulate matter (which will be hereinafter referred to as "PM") in the exhaust gas.

PTL 1 discloses a technology used in an exhaust gas purification system including an SCR catalyst provided downstream of a filter in an exhaust passage of an internal combustion engine to correct the quantity of reducing agent to be supplied to the SCR catalyst taking account of the amount of PM deposited in the filter. In the technology disclosed in PTL 1, the quantity of reducing agent supplied to the SCR filter is to be corrected because $NO_2$ in the exhaust gas is reduced to NO by the PM deposited in the filter and the proper quantity of reducing agent to be supplied to the SCR catalyst for removal of NOx changes accordingly.

NON-PTL 1 teaches that increases in the amount of PM deposited in an SCR filter make the ammonia adsorption amount defined as the amount of ammonia adsorbed in an SCR catalyst supported on the SCR filter more apt to increase.

CITATION LIST

Patent Literature

PTL 1: Japanese Patent Application Laid-Open No. 2009-293606
PTL 2: Japanese Patent Application Laid-Open No. 2001-193440
NON-PTL 1: "Physico-Chemical Modeling of an Integrated SCR on DPF (SCR/DPF) System", SAE International Journal of Engines, August 2012 vol. 5 no. 3, 958-974

SUMMARY

Technical Problem

As disclosed in the aforementioned citation, (PTL 1), the amount of ammonia adsorbed in an SCR catalyst supported on an SCR filter may vary depending on the state of deposition of PM in the SCR filter. If the amount of ammonia adsorbed in the SCR catalyst is too large relative to a target adsorption amount, there is a possibility that an increase in the quantity of ammonia flowing out of the SCR catalyst may result. If the amount of ammonia adsorbed in the SCR catalyst is too small relative to the target adsorption amount, there is a possibility that it may be difficult to achieve a desired NOx removal rate with the SCR filter.

The present disclosure has been made to address the above-descried problem, and embodiments of the present disclosure may adjust the ammonia adsorption amount in an SCR catalyst supported on an SCR filter as close as possible to a target adsorption amount by controlling the quantity of ammonia supplied to the SCR filter taking account of the state of deposition of PM in the SCR filter in an exhaust gas purification system including the SCR filter.

Solution to Problem

As an SCR filter traps PM in the exhaust gas, the trapped PM is deposited in the SCR filter gradually. In the SCR filter, PM is firstly deposited in partition walls of the SCR filter, specifically, in micro-pores in the partition walls. After the amount of PM deposited in the partition walls reaches its upper limit, PM is deposited on the surface of the partition walls. In the following, deposition of PM in the partition walls of the SCR filter will be sometimes referred to as "in-wall PM deposition", and the period during which the in-wall PM deposition progresses will be sometimes referred to as the "in-wall PM deposition period". The amount of PM deposited in the partition walls of the SCR filter will be sometimes referred to as the "in-wall PM deposition amount". Furthermore, deposition of PM on the surface of the partition walls of the SCR filter will be sometimes referred to as "surface PM deposition", and the period during which the surface PM deposition progresses will be sometimes referred to as the "surface PM deposition period". The amount of PM deposited on the surface of the partition walls of the SCR filter will be sometimes referred to as the "surface PM deposition amount".

As described above, it has been conventionally considered that increases in the amount of PM deposited in the SCR filter tend to make the amount of ammonia adsorbed in an SCR catalyst supported on the SCR filter more apt to increase. However, details of relationship between the state of deposition of PM in the SCR filter and the tendency of increase of the ammonia adsorption amount in the SCR catalyst had not been known previously. The inventors of the present disclosure discovered the tendency that while the ammonia adsorption amount in the SCR catalyst is more apt to increase when the in-wall PM deposition amount in the SCR filter is large than when the in-wall PM deposition amount is small, increases or decreases in the surface PM deposition amount in the SCR filter have little effect on increases or decreases in the ammonia adsorption amount in the SCR catalyst. It is considered that the reason why the ammonia adsorption amount in the SCR catalyst is more apt to increase when the in-wall PM deposition amount in the SCR filter is large than when the in-wall PM deposition amount is small is that increases in the in-wall PM deposition amount lead to increases in the saturated ammonia adsorption amount of the SCR catalyst, leading to decreases in the quantity of ammonia desorbed from the SCR catalyst. On the other hand, changes in the surface PM deposition amount lead to little changes in the saturated ammonia adsorption amount of the SCR catalyst, and little changes in the quantity of ammonia desorbed from the SCR catalyst accordingly. Therefore, it is considered that increases or decreases in the surface PM deposition amount in the SCR filter have little effect on increases or decreases in the ammonia adsorption amount in the SCR catalyst. The present disclosure applies the above-described discovery to control of the ammonia supply quantity in an exhaust gas purification system including an SCR filter.

More specifically, according to a first aspect of the present disclosure, there may be provided an exhaust gas purification system for an internal combustion engine comprising: an SCR filter provided in an exhaust passage of an internal combustion engine including a filter and an SCR catalyst supported on said filter, said SCR catalyst having a capability of reducing NOx in exhaust gas by using ammonia as reducing agent, and said filter having a function of trapping particulate matter in exhaust gas; an ammonia supplier configured to supply ammonia to said SCR filter; and a controller comprising at least one processor configured to control the quantity of ammonia supplied by said ammonia supplier so as to adjust the ammonia adsorption amount in said SCR catalyst to a target adsorption amount, wherein said controller may make the quantity of ammonia supplied by said ammonia supplier smaller when a differential pressure change rate at the time when ammonia is supplied by said ammonia supplier is lower than a predetermined threshold than when said differential pressure change rate at the time when ammonia is supplied by said ammonia supplier is equal to or larger than said predetermined threshold and may control the quantity of ammonia supplied by said ammonia supplier in such a way that the change in the quantity of ammonia supplied by said ammonia supplier relative to the change in a filter PM deposition amount is zero when said differential pressure change rate is lower than said predetermined threshold, said differential pressure change rate being defined as the amount of increase in a converted differential pressure value per unit increase in said filter PM deposition amount, said converted differential pressure value being obtained by normalizing the differential pressure of the exhaust gas across said SCR filter by the exhaust gas rate, and said filter PM deposition amount being defined as the amount of particulate matter deposited in said SCR filter that is estimated on the basis of a parameter other than said converted differential pressure value.

In the exhaust gas purification system according to the present disclosure, ammonia serving as reducing agent is supplied to the SCR filter by the ammonia supplier. The ammonia thus supplied is adsorbed in the SCR catalyst supported on the SCR filter. The ammonia supplier may supply ammonia in the form of either gas or liquid, or alternatively the ammonia supplier may supply precursor of ammonia.

According to the above-described discovery made by the inventors, even if the quantity of ammonia supplied to the SCR filter is the same, the increase in the amount of ammonia adsorbed in the SCR catalyst may vary depending on the state of deposition of PM in the SCR filter. More specifically, as described above, the mode of deposition of PM in the SCR filter shifts to surface PM deposition after the in-wall PM deposition amount reaches its upper limit. Therefore, during the surface PM deposition period, the in-wall PM deposition amount is always at its upper limit. Therefore, during the surface PM deposition period, the in-wall PM deposition amount is larger than that during the in-wall PM deposition period. The ammonia adsorption amount in the SCR catalyst is more apt to increase when the in-wall PM deposition amount is large than when the in-wall PM deposition amount is small. Therefore, even if the quantity of ammonia supplied to the SCR filter is the same, the ammonia adsorption amount in the SCR catalyst is more apt to increase during the surface PM deposition period than during the in-wall PM deposition period. Therefore, if the quantity of ammonia supplied to the SCR filter during the surface PM deposition period is equal to the quantity of ammonia supplied to the SCR filter during the in-wall PM deposition period, there is a possibility that the ammonia adsorption amount in the SCR catalyst may become too much larger than a target adsorption amount during the surface PM deposition period.

On the basis of the conventionally known theory that increases in the PM deposition amount in an SCR filter make the ammonia adsorption amount in an SCR catalyst supported on that SCR filter more apt to increase, the system may be designed in such a way as to decrease the quantity of ammonia supplied to the SCR filter in response to increases in the surface PM deposition amount, during the surface PM deposition period. However, according to the above-described discovery by the inventors, increases or decreases in the surface PM deposition amount in the SCR filter have little effect on the ammonia adsorption amount in the SCR catalyst. Therefore, during the surface PM deposition period, if the quantity of ammonia supplied to the SCR filter is decreased in response to increases in the PM deposition amount (namely, increases in the surface PM deposition amount), there is a possibility that the ammonia adsorption amount in the SCR catalyst may become too much smaller than the target adsorption amount.

In view of the above, in the system according to the present disclosure, the ammonia supply quantity may be made smaller during the surface PM deposition period than during the in-wall PM deposition period, if the values of the other parameters relating to the determination of the ammonia supply quantity are the same. Moreover, during the surface PM deposition period, the change in the quantity of ammonia supplied to the SCR filter relative to the change in the filter PM deposition amount may be kept equal to zero. In other words, during the surface PM deposition period, the ammonia supply quantity may be kept constant regardless of the filter PM deposition amount, if the values of the parameters relating to the determination of the ammonia supply quantity are the same.

Specifically, the controller may make the quantity of ammonia supplied by the ammonia supplier smaller when the differential pressure change rate at the time when ammonia is supplied by the ammonia supplier is lower than the predetermined threshold than when the differential pressure change rate at that time is equal to or higher than the predetermined threshold. Moreover, the controller may control the quantity of ammonia supplied by the ammonia supplier in such a way that the change in the quantity of ammonia supplied by the ammonia supplier relative to the change in a filter PM deposition amount is zero when the differential pressure change rate at the time when ammonia is supplied by the ammonia supplier is lower than the predetermined threshold. The differential pressure change rate is the amount of increase in the converted differential pressure value per unit increase in the filter PM deposition amount. The value of the PM deposition amount is estimated on the basis of a parameter other than the converted differential pressure value. The value of the differential pressure change rate defined as above is lower during the surface PM deposition period than during the in-wall PM deposition period. Therefore, the predetermined threshold referred to in the exhaust gas purification system according to the present disclosure may be set to a value with which a distinction between whether it is during the in-wall PM deposition period or during the surface PM deposition period now can be made.

The mode of PM deposition in the SCR filter shifts to surface PM deposition after in-wall PM deposition reaches its upper limit. However, it should be noted that oxidation of PM in the SCR filter can occur both in partition walls of the SCR filter and on the surface of partition walls. Therefore, even after the mode of PM deposition in the SCR filter has once shifted to surface PM deposition, the in-wall PM deposition amount may be decreased by oxidation of PM in partition walls in some cases. In such cases, when deposition of PM restarts, PM is deposited in partition walls again, in other words, the mode of deposition shifts from surface PM deposition to in-wall PM deposition. Hence, it is difficult to make an identification between the in-wall PM deposition period and the surface PM deposition period accurately only on the basis of the time elapsed since the start of deposition of PM in the SCR filter or the filter PM deposition amount (i.e. the overall amount of PM deposited in the SCR filter). Therefore, in the exhaust gas purification system according to the present disclosure, the differential pressure change rate is used as a parameter in making an identification between the in-wall PM deposition period and the surface PM deposition period.

As the ammonia supply apparatus controls the quantity of ammonia supplied by the ammonia supply apparatus on the basis of the differential pressure change rate as described above, the ammonia supply quantity is made smaller in the case where the time at which ammonia is supplied to the SCR filter is during the surface PM deposition period than in the case where the time at which ammonia is supplied to the SCR filter is during the in-wall PM deposition period, if the other parameters relating to the determination of the ammonia supply quantity are the same. This control can prevent the ammonia adsorption amount in the SCR catalyst from becoming too much larger than the target adsorption amount during the surface PM deposition period. Furthermore, as the ammonia supply apparatus controls the quantity of ammonia supplied by the ammonia supply apparatus on the basis of the differential pressure change rate as described above, the change in the quantity of ammonia supplied to the SCR filter relative to the change in the filter PM deposition amount is kept equal to zero, in the case where the time at which ammonia is supplied to the SCR filter is during the surface PM deposition period. This control can prevent the ammonia adsorption amount in the SCR catalyst from becoming too much smaller than the target adsorption amount during the surface PM deposition period. Therefore, according to the present disclosure, the ammonia adsorption amount in the SCR catalyst supported on the SCR filter can be adjusted as close as possible to the target adsorption amount.

Advantageous Effects of Invention

According to the present disclosure, the ammonia adsorption amount in an SCR catalyst supported on an SCR filter can be adjusted as close as possible to a target adsorption amount.

DESCRIPTION OF EMBODIMENTS

In the following, a specific embodiment of the present disclosure will be described with reference to the drawings. The dimensions, materials, shapes, relative arrangements, and other features of the components that will be described in connection with the embodiments are not intended to limit the technical scope of the present disclosure only to them, unless particularly stated.

Embodiment 1

Figure 1:
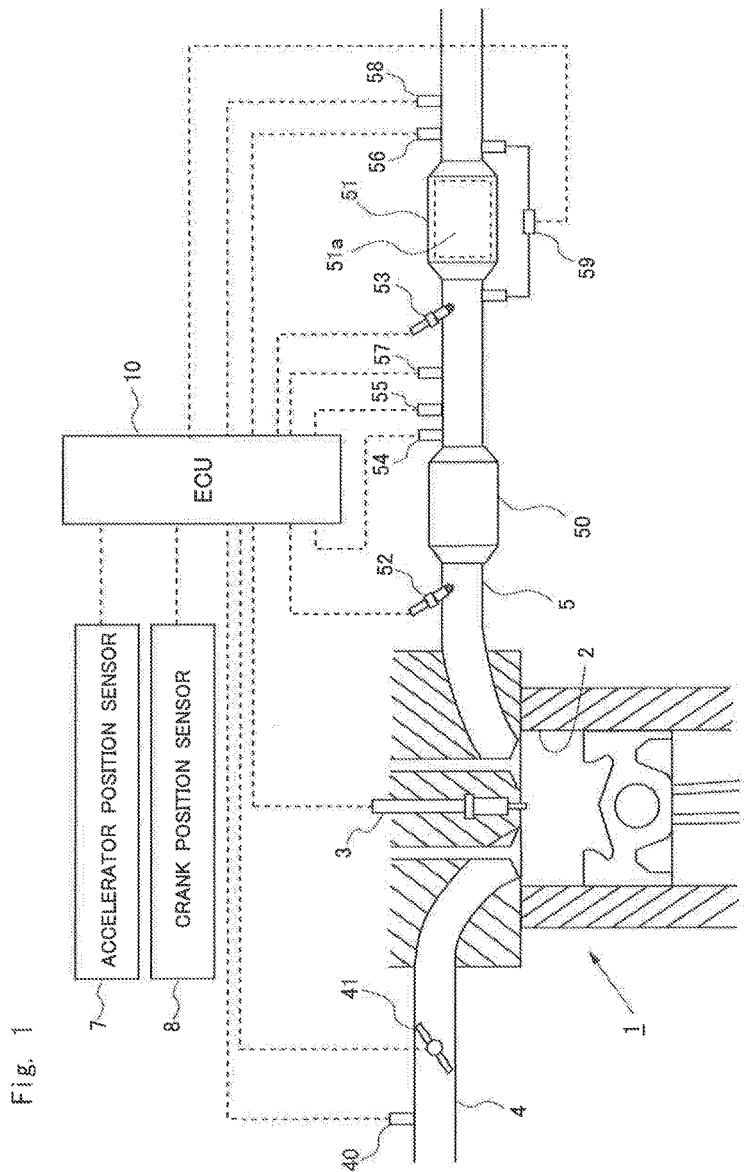
FIG. 1 is a diagram showing the general configuration of an internal combustion engine and its air-intake and exhaust systems according to embodiments of the present disclosure.

FIG. 1 is a diagram showing the general configuration of an internal combustion engine and its air-intake and exhaust systems according to a first embodiment. The internal combustion engine 1 shown in FIG. 1 is a compression-ignition internal combustion engine (diesel engine) using light oil as fuel. It should be understood that the present disclosure can also be applied to a spark-ignition internal combustion engine using gasoline or the like as fuel.

The internal combustion engine 1 has a fuel injection valve 3 that injects fuel into a cylinder 2. In the case where the internal combustion engine 1 is a spark-ignition internal combustion engine, the fuel injection valve 3 may be adapted to inject fuel into an intake port.

The internal combustion engine 1 is connected with an intake passage 4. The intake passage 4 is provided with an air flow meter 40 and a throttle valve 41. The air flow meter 40 outputs an electrical signal representing the quantity (or mass) of the intake air flowing in the intake passage 4. The throttle valve 41 is arranged in the intake passage 4 downstream of the air-flow meter 40. The throttle valve 41 changes the channel cross sectional area of the intake passage 4 to adjust the intake air quantity of the internal combustion engine 1.

The internal combustion engine 1 is connected with an exhaust passage 5. The exhaust passage 5 is provided with an oxidation catalyst 50, an SCR filter 51, a fuel addition valve 52, and a urea solution addition valve 53. The SCR filter 51 is composed of a wall-flow filter made of a porous base material and an SCR catalyst 51a supported thereon. The filter has the function of trapping PM in the exhaust gas.

The SCR catalyst 51a is capable of reducing NOx in the exhaust gas using ammonia as reducing agent. Thus, the SCR filter 51 is capable of trapping PM and removing NOx. The oxidation catalyst 50 is arranged in the exhaust passage 5 upstream of the SCR filter 51. The fuel addition valve 52 is arranged in the exhaust passage 5 upstream of the oxidation catalyst 50. The fuel addition valve 52 is used to add fuel to the exhaust gas flowing in the exhaust passage 5. The urea solution addition valve 53 is arranged in the exhaust passage 5 downstream of the oxidation catalyst 50 and upstream of the SCR filter 51. The urea solution addition valve 53 is used to add urea solution to the exhaust gas flowing in the exhaust passage 5. As urea solution is added to the exhaust gas through the urea solution addition valve 53, the urea solution is supplied to the SCR filter 51. Thus, urea as a precursor of ammonia is supplied to the SCR filter 51. In the SCR filter 51, ammonia generated by hydrolysis of supplied urea is adsorbed in the SCR catalyst 51a. The ammonia adsorbed in the SCR catalyst 51a functions as a reducing agent to reduce NOx in the exhaust gas. The urea solution addition valve 53 may be replaced by an ammonia addition valve that adds ammonia gas to the exhaust gas.

The exhaust passage 5 downstream of the oxidation catalyst 50 and upstream of the urea solution addition valve 53 is provided with an $O_2$ sensor 54, an upstream temperature sensor 55, and an upstream NOx sensor 57. The exhaust passage 5 downstream of the SCR filter 51 is provided with a downstream temperature sensor 56 and a downstream NOx sensor 58. The $O_2$ sensor 54 outputs an electrical signal representing the $O_2$ concentration in the exhaust gas. The upstream temperature sensor 55 and the downstream temperature sensor 56 each output an electrical signal representing the temperature of the exhaust gas. The upstream NOx sensor 57 and the downstream NOx sensor 58 each output an electrical signal representing the NOx concentration in the exhaust gas. The exhaust passage 5 is provided with a differential pressure sensor 59. The differential pressure sensor 59 outputs an electrical signal representing the differential pressure of exhaust gas across the SCR filter 51, which will be sometimes referred to as the "filter differential pressure" hereinafter.

The internal combustion engine 1 is equipped with an electronic control unit (ECU) 10. The ECU 10 is a unit that controls the operation state of the internal combustion engine 1. The ECU 10 is electrically connected with various sensors including an accelerator position sensor 7 and a crank position sensor 8 as well as the air flow meter 40, the Oz sensor 54, the upstream temperature sensor 55, the upstream NOx sensor 57, the downstream temperature sensor 56, the downstream NOx sensor 58, and the differential pressure sensor 59 mentioned above. The accelerator position sensor 7 is a sensor that outputs an electrical signal representing the amount of operation of an accelerator pedal (accelerator opening degree), which is not shown in the drawings. The crank position sensor 8 is a sensor that outputs an electrical signal representing the rotational position of the engine output shaft (or crankshaft) of the internal combustion engine 1. Signals output from these sensors are input to the ECU 10. The ECU 10 estimates the temperature of the SCR filter 51 on the basis of the output value of the downstream temperature sensor 56. This temperature will be sometimes referred to as the "filter temperature" hereinafter. The ECU 10 estimates the flow rate of the exhaust gas flowing into the SCR filter 51 on the basis of the output value of the air flow meter 40. This flow rate will be sometimes simply referred to as the "exhaust gas flow rate" hereinafter.

The ECU 10 is electrically connected with various devices including the fuel injection valve 3, the throttle valve 41, the fuel addition valve 52, and the urea solution addition valve 53 mentioned above. The ECU 10 controls these devices using signals output from the aforementioned sensors. For instance, the ECU 10 controls the quantity of urea solution added through the urea solution addition valve 53 so as to adjust the ammonia adsorption amount in the SCR catalyst 51a to a predetermined target adsorption amount. The target adsorption amount is a target value of the ammonia adsorption amount in the SCR catalyst 51a, which is determined on the basis of the operation state of the internal combustion engine 1. The target adsorption amount is determined in advance by, for example, an experiment as a value at which a desired NOx removal rate with the SCR filter 51 can be achieved and the quantity of ammonia flowing out of the SCR filter 51 can be kept within an allowable range. The target adsorption amount is stored in the ECU 10.

The ECU 10 executes a filter regeneration process by adding fuel through the fuel addition valve 52 when the amount of PM deposited in the SCR filter 51 (which will be sometimes referred to as the "filter PM deposition amount" hereinafter) reaches a predetermined deposition amount. The filter PM deposition amount is estimated by a method that will be described later. In the filter regeneration process, the temperature of the SCR filter 51 is raised by oxidation heat produced by oxidation of fuel added through the fuel addition valve 52 in the oxidation catalyst 50. As a result, the PM deposited in the SCR filter 51 is burned and removed.

(Estimation of the Filter PM Deposition Amount)

Figure 2:
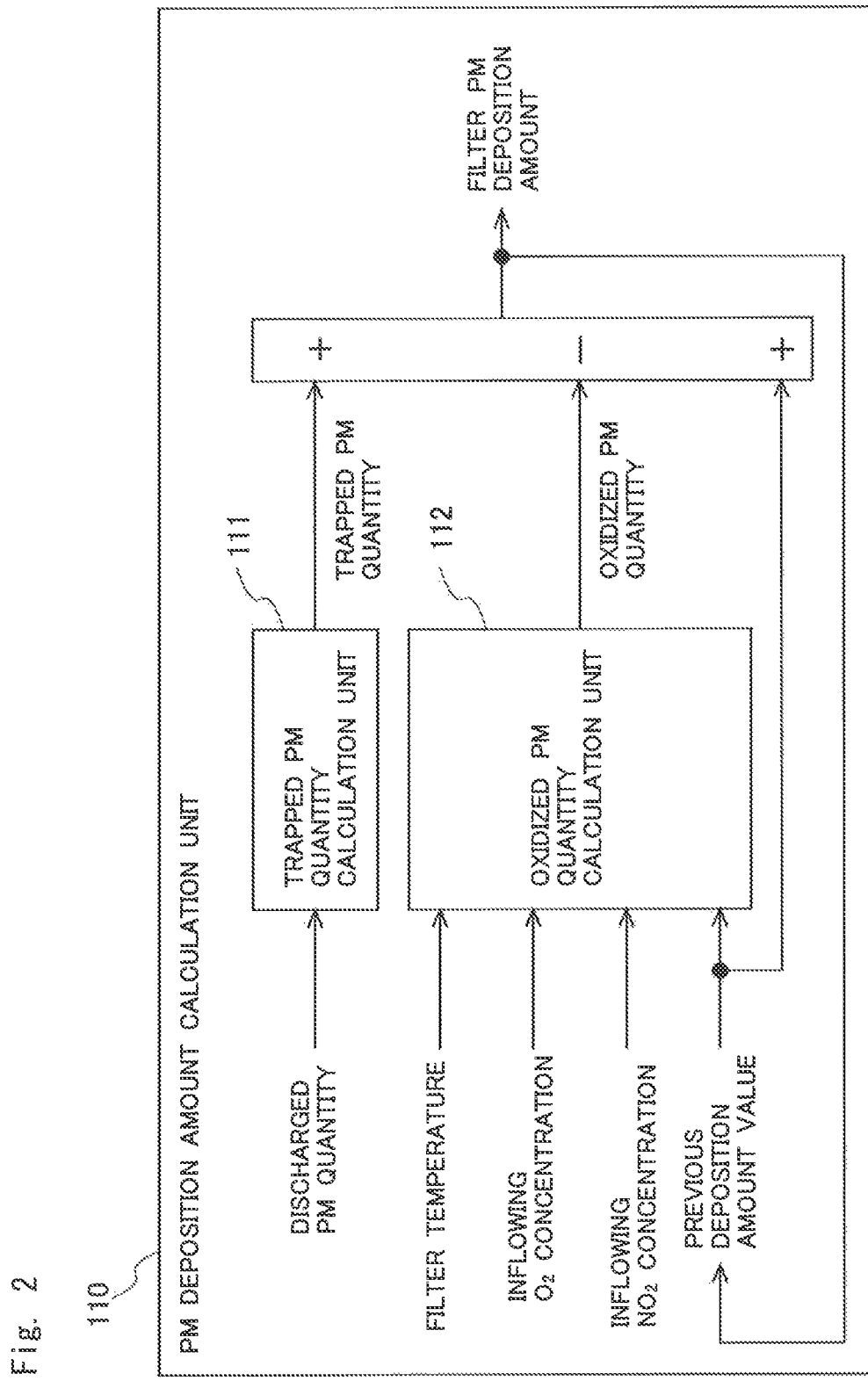
FIG. 2 is a block diagram illustrating the functions of a PM deposition amount calculation unit in an ECU according to the embodiments of the present disclosure.

In this embodiment, the ECU 10 calculates the filter PM deposition amount repeatedly at a predetermined calculation interval. FIG. 2 is a block diagram illustrating the functions of a PM deposition amount calculation unit in the ECU 10. The PM deposition amount calculation unit 110 is a functional unit configured to calculate the filter PM deposition amount. The PM deposition amount calculation unit 110 is constituted by execution of a certain program in the ECU 10. The PM deposition amount calculation unit 110 in this embodiment is configured to calculate the filter PM deposition amount without using a converted differential pressure value, which is a converted value of the filter differential pressure measured by the differential pressure sensor 59 obtained by conversion based on the assumption that the exhaust gas flow rate is constant obtained by normalizing the filter differential pressure measured by the differential pressure sensor 59 by the exhaust gas flow rate. The converted differential pressure value will be described later. Furthermore, the PM deposition amount calculation unit 110 in this embodiment is configured to calculate the filter PM deposition amount on the assumption that the PM trapping function of the SCR filter 51 is in a normal condition.

The PM deposition amount calculation unit 110 calculates the filter PM deposition amount at the present time by integrating the trapped PM quantity defined as the quantity of PM trapped by the SCR filter 51 and the oxidized PM quantity defined as the quantity of PM oxidized in the SCR filter 51. Specifically, the PM deposition amount calculation unit 110 includes a trapped PM quantity calculation unit 111 and an oxidized PM quantity calculation unit 112. The trapped PM quantity calculation unit 111 calculates a trapped PM quantity as the quantity of PM trapped by the SCR filter 51 over a first predetermined period that is determined in accordance with the interval of calculation of the filter PM deposition amount. The oxidized PM quantity calculation unit 112 calculates an oxidized PM quantity as the quantity of PM oxidized in the SCR filter 51 over the first predetermined period.

The trapped PM quantity calculation unit 111 has as an input the quantity of PM discharged from the internal combustion engine 1 over the first predetermined period (which will be sometimes simply referred to as the "discharged PM quantity" hereinafter). The discharged PM quantity can be estimated on the basis of the operation state of the internal combustion engine 1. The trapped PM quantity calculation unit 111 calculates the trapped PM quantity by multiplying the input value of the discharged PM quantity by a predetermined PM trapping rate, which is the rate of the quantity of PM trapped by the SCR filter 51 to the quantity of PM flowing into the SCR filter 51. The predetermined PM trapping rate may be a value estimated on the basis of the exhaust gas flow rate.

The oxidized PM quantity calculation unit 112 has as inputs the filter temperature, the $O_2$ concentration in the exhaust gas flowing into the SCR filter 51 (which will be sometimes referred to as the "inflowing $O_2$ concentration" hereinafter), and the $NO_2$ concentration in the exhaust gas flowing into the SCR filter 51 (which will be sometimes referred to as the "inflowing $NO_2$ concentration" hereinafter). The filter temperature can be estimated from the output value of the downstream temperature sensor 56. The inflowing $O_2$ concentration is measured by the $O_2$ sensor 54. Alternatively, the inflowing $O_2$ concentration can be estimated on the basis of the air-fuel ratio of the exhaust gas and the operation state of the internal combustion engine 1 etc. The inflowing $NO_2$ concentration can be estimated from the output value of the air flow meter 40, the output value of the upstream temperature sensor 55, and the output value of the upstream NOx sensor 57 etc. More specifically, the quantity of NOx in the exhaust gas can be estimated from the output value of the upstream NOx sensor 57 and the exhaust gas flow rate. The proportion of the quantity of $NO_2$ in the quantity of NOx in the exhaust gas can be estimated from the temperature of the oxidation catalyst 50, which is estimated from the output value of the upstream temperature sensor 55, and the exhaust gas flow rate. Then, the inflowing $NO_2$ concentration can be estimated from the quantity of NOx in the exhaust gas and the estimated proportion of the quantity of $NO_2$ in the quantity of NOx in the exhaust gas etc. Furthermore, the oxidized PM quantity calculation unit 112 also has as an input a value of the filter PM deposition amount calculated in the previous (or last time) calculation. This input value will be sometimes referred to as the "previous deposition amount value" hereinafter. The oxidized PM quantity calculation unit 112 calculates the oxidized PM quantity from the input values of the filter temperature, the inflowing $O_2$ concentration, the inflowing $NO_2$ concentration, and the previous deposition amount value.

The PM deposition amount calculation unit 110 calculates the filter PM deposition amount of this time (or the filter PM deposition amount at the present time) by adding the trapped PM quantity as an increase to the previous deposition amount value and subtracting the oxidized PM quantity as a decrease from it. The filter PM deposition amount of this time thus calculated will serve as the previous deposition amount value in the next time calculation process.

The method of calculation of the filter PM deposition amount according to the present disclosure is not limited to that described above. In the present disclosure, the filter PM deposition amount may be calculated by any known method without using the converted differential pressure value that will be described later.

(Control of Ammonia Supply Quantity)

As described above, in the system of this embodiment, ammonia produced by hydrolysis of urea solution added through the urea solution addition valve 53 is supplied to the SCR filter 51. The ECU 10 controls the quantity of urea solution added through the urea solution addition valve 53, thereby controlling the quantity of ammonia supplied to the SCR filter 51 (or the ammonia supply quantity) in such a way as to adjust the ammonia adsorption amount in the SCR catalyst 51a to a target adsorption amount.

A portion of ammonia supplied to the SCR filter 51 and adsorbed in the SCR catalyst 51a is consumed in reduction of NOx. Another portion of ammonia adsorbed in the SCR catalyst 51a is desorbed from the SCR catalyst 51a without being consumed in reduction of NOx. In the system of this embodiment, in order to adjust the ammonia adsorption amount in the SCR catalyst 51a to the target adsorption amount, a quantity of ammonia equal to the sum of the ammonia consumption quantity defined as the quantity of ammonia consumed in reduction of NOx in the SCR catalyst 51a and the ammonia desorption quantity defined as the quantity of ammonia desorbed from the SCR catalyst 51a is supplied to the SCR filter 51.

Figure 3:
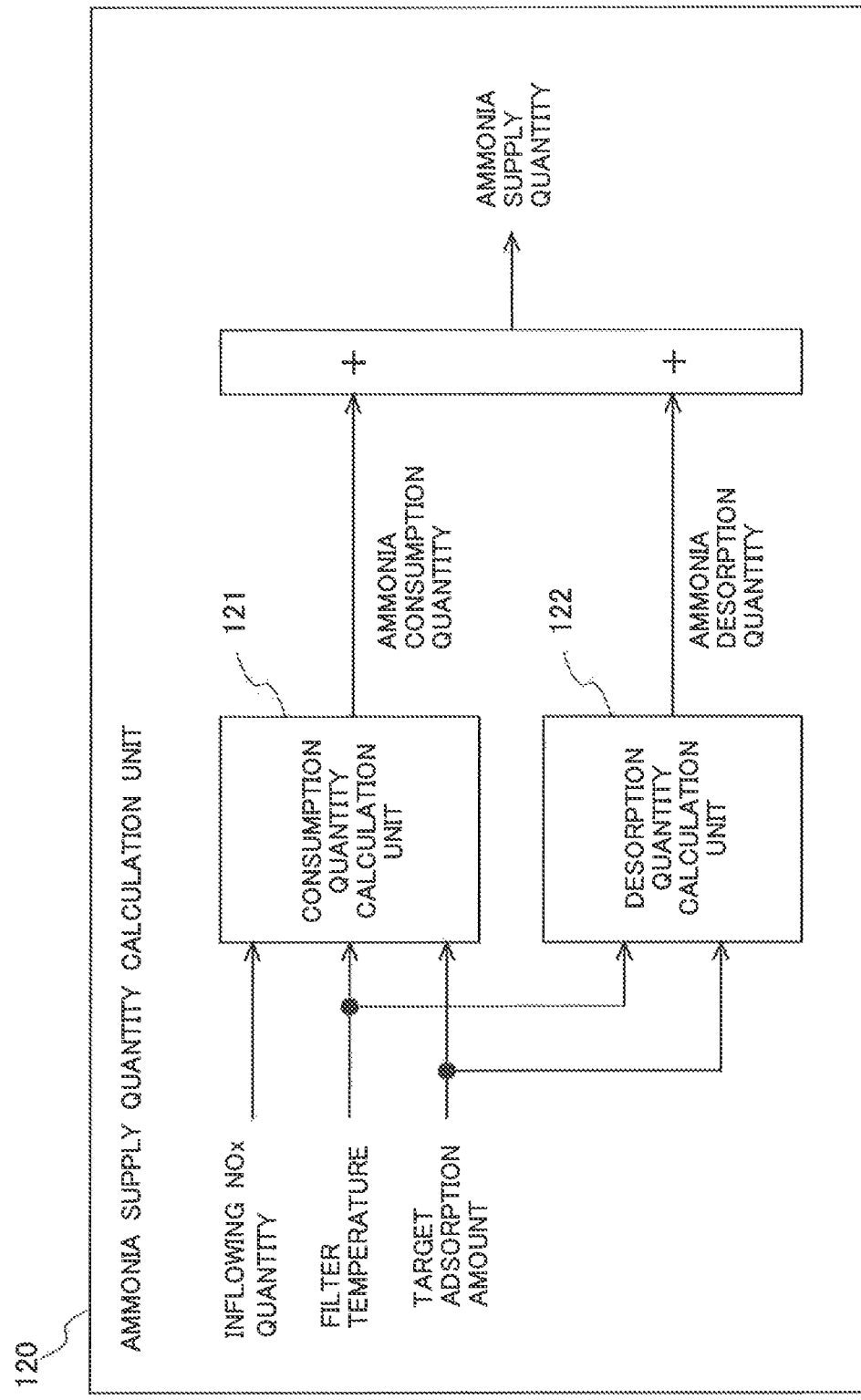
FIG. 3 is a block diagram illustrating the functions of an ammonia supply quantity calculation unit in the ECU according to the embodiments of the present disclosure.

In the system of this embodiment, the ECU 10 calculates the ammonia supply quantity with the SCR filter 51 (namely, the quantity of ammonia to be supplied to the SCR filter 51) repeatedly at a predetermined calculation interval. FIG. 3 is a block diagram illustrating the functions of an ammonia supply quantity calculation unit in the ECU 10. The ammonia supply quantity calculation unit 120 is a functional unit configured to calculate the quantity of ammonia to be supplied to the SCR filter 51. The ammonia supply quantity calculation unit 120 is constituted by execution of a certain program in the ECU 10.

The ammonia supply quantity calculation unit 120 includes a consumption quantity calculation unit 121 that calculates the ammonia consumption quantity and a desorption quantity calculation unit 122 that calculates the ammonia desorption quantity. The consumption quantity calculation unit 121 calculates the ammonia consumption quantity as the quantity of ammonia consumed in reduction of NOx in the SCR catalyst 51a over a predetermined supply period through which ammonia is supplied to the SCR filter 51 (namely the period through which addition of urea solution through the urea solution addition valve 53 is performed). The desorption quantity calculation unit 122 calculates the ammonia desorption quantity as the quantity of ammonia desorbed from the SCR catalyst 51a over the predetermined supply period. The ammonia supply quantity calculation unit 120 calculates the ammonia supply quantity as the sum of the ammonia consumption quantity calculated by the consumption quantity calculation unit 121 and the ammonia desorption quantity calculated by the desorption quantity calculation unit 122. Thus, the ammonia supply quantity calculation unit 120 calculates the ammonia supply quantity as the quantity of ammonia to be supplied to the SCR filter 51 over the predetermined supply period.

The consumption quantity calculation unit 121 has as inputs the inflowing NOx quantity, the filter temperature, and the target adsorption amount. The inflowing NOx quantity mentioned above is the quantity of NOx flowing into the SCR filter 51 during the predetermined supply period. The inflowing NOx quantity can be calculated from the NOx concentration in the exhaust gas flowing into the SCR filter 51 measured by the upstream NOx sensor 57 and the exhaust gas flow rate. The NOx removal rate with the SCR filter 51 correlates with the filter temperature and the ammonia adsorption amount in the SCR catalyst 51*a*. The consumption quantity calculation unit 121 calculates the estimated NOx removal rate supposed to be achieved with the SCR catalyst 51*a* (which will be sometimes referred to as the "estimated NOx removal rate" hereinafter) using the input values of the filter temperature and the target adsorption amount. Then, the ammonia consumption quantity is calculated from the input value of the inflowing NOx quantity and the estimated NOx removal rate calculated as above. Thus, the consumption quantity calculation unit 121 calculates the ammonia consumption quantity in an assumed case where the ammonia adsorption amount in the SCR catalyst 51*a* is equal to the target adsorption amount.

The desorption quantity calculation unit 122 has as inputs the filter temperature and the target adsorption amount. If the ammonia adsorption amount in the SCR catalyst 51*a* remains the same, the higher the filter temperature is, the larger the ammonia desorption quantity is. If the filter temperature remains the same, the larger the ammonia adsorption amount in the SCR catalyst 51*a* is, the larger the ammonia desorption quantity is. The desorption quantity calculation unit 122 calculates the ammonia desorption quantity from the input values of the filter temperature and the target adsorption amount on the basis of the above relationships. Thus, the desorption quantity calculation unit 122 calculates the ammonia desorption quantity in the assumed case where the ammonia adsorption amount in the SCR catalyst 51*a* is equal to the target adsorption amount. The method of calculation of the ammonia desorption quantity by the desorption quantity calculation unit 122 will be described later more specifically.

(Relationship Between State of Deposition of PM and Ammonia Adsorption Amount)

Now, we will discuss relationship between the state of deposition of PM in the SCR filter 51 and the ammonia adsorption amount in the SCR catalyst 51*a*. As described before, the inventors of the present disclosure made findings about relationship between the state of deposition of PM in the SCR filter and the tendency of increase of the ammonia adsorption amount in the SCR catalyst. According to the findings, when the filter temperature and the ammonia adsorption amount in the SCR catalyst 51*a* are the same, the ammonia desorption quantity is smaller when the amount of PM deposited in the partition walls of the SCR filter 51 (or the in-wall PM deposition amount) is large than when the in-wall PM deposition amount is small. Therefore, when the values of the other parameters relating to the increase of the ammonia adsorption amount in the SCR catalyst 51*a* are the same, the ammonia adsorption amount in the SCR catalyst 51*a* is more apt to increase when the in-wall PM deposition amount is large than when the in-wall PM deposition amount is small. At times after the in-wall PM deposition amount in the SCR filter 51 has reached its upper limit and the mode of deposition of PM in the SCR filter 51 has shifted from in-wall PM deposition to surface PM deposition, the ammonia desorption quantity changes little even when the filter PM deposition amount (that is, the surface PM deposition amount) changes, so long as the filter temperature and the ammonia adsorption amount in the SCR catalyst 51*a* remain the same. Therefore, increases or decreases in the surface PM deposition amount have little effect on increases or decreases in the ammonia adsorption amount in the SCR catalyst 51*a*.

Figure 4:
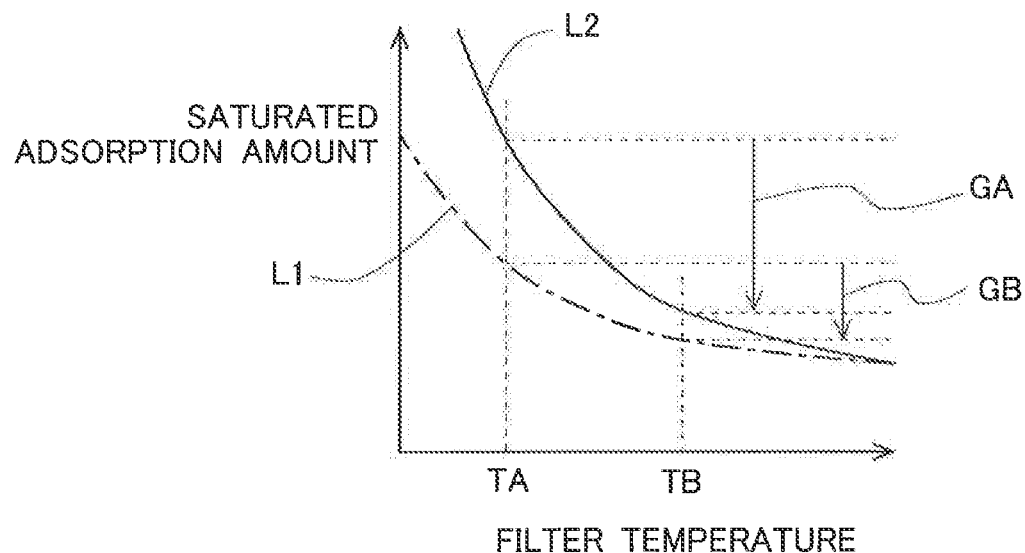
FIG. 4 is a graph showing how the state of deposition of PM in an SCR filter affects the saturated ammonia adsorption amount of an SCR catalyst supported on the SCR filter.

The above-described tendency of change in the ammonia adsorption amount in the SCR catalyst 51*a* depending on the state of deposition of PM in the SCR filter 51 is considered to be attributable to relation between the state of deposition of PM in the SCR filter 51 and the saturated ammonia adsorption amount in the SCR catalyst 51*a*. The saturated ammonia adsorption amount is the largest amount of ammonia that can be adsorbed in the SCR catalyst 51*a*, which will be sometimes simply referred to as the "saturated adsorption amount" hereinafter. FIG. 4 is a graph illustrating how the state of deposition of PM in the SCR filter 51 affects the saturated adsorption amount of the SCR catalyst 51*a*. In FIG. 4, the horizontal axis represents the filter temperature, and the vertical axis represents the saturated adsorption amount of the SCR catalyst 51*a*. Line L1 in FIG. 4 represents relationship between the filter temperature and the saturated adsorption amount in a state in which PM is not deposited in the SCR filter 51. Line L2 in FIG. 4 represents relationship between the filter temperature and the saturated adsorption amount in a state in which PM is deposited in the SCR filter 51. As shown in FIG. 4, the higher the filter temperature is (namely, the higher the temperature of the SCR catalyst 51*a* is), the smaller the saturated adsorption amount of the SCR catalyst 51*a* is, in both the states in which PM is not deposited in the SCR filter 51 and in which PM is deposited in the SCR filter 51. In other words, the lower the filter temperature is, the larger the saturated adsorption amount of the SCR catalyst 51*a* is. As shown in FIG. 4, at the same filter temperature, the saturated adsorption amount of the SCR catalyst 51*a* is larger in the state in which PM is deposited in the SCR filter 51 than in the state in which PM is not deposited in the SCR filter 51.

Figure 5:
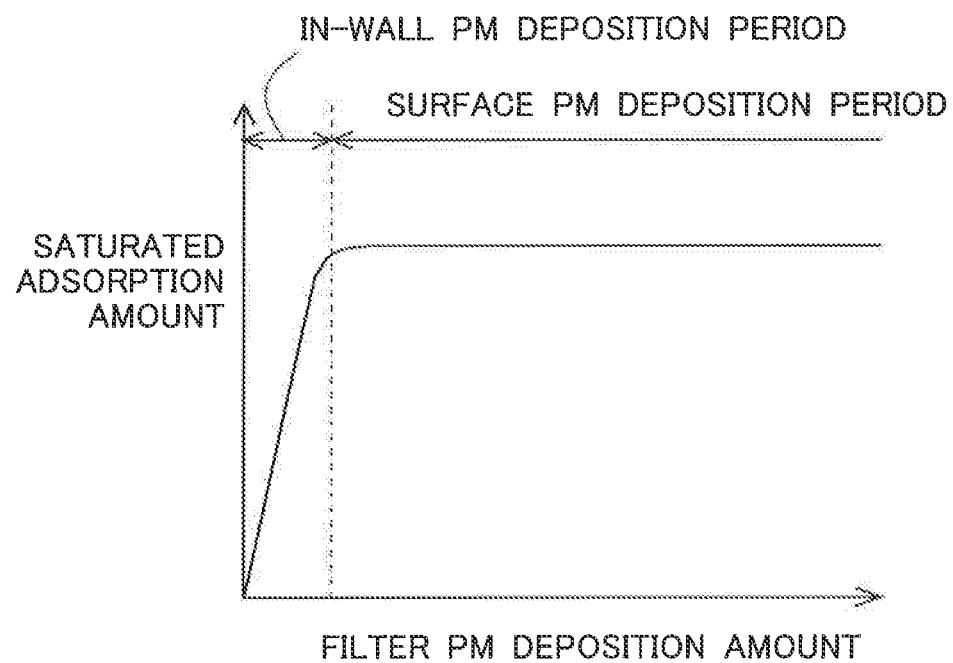
FIG. 5 is a graph showing relationship between the state of deposition of PM in the SCR filter and the saturated ammonia adsorption amount of the SCR catalyst.

Relationship between the state of deposition of PM in the SCR filter 51 and the saturated adsorption amount of the SCR catalyst 51*a* will be described below more specifically with reference to FIG. 5. FIG. 5 is a graph showing assumed relationship between the state of deposition of PM in the SCR filter 51 and the saturated adsorption amount of the SCR catalyst 51*a*. In FIG. 5, the horizontal axis represents the filter PM deposition amount, and the vertical axis represents the saturated adsorption amount of the SCR catalyst 51*a*. FIG. 5 shows the change of the saturated adsorption amount of the SCR catalyst 51*a* in a case where the filter temperature is kept constant.

As shown in FIG. 5, in the process of deposition of PM in the SCR filter 51, PM firstly deposits in partition walls (specifically, micro-pores in partition walls). Then, after the in-wall PM deposition amount reaches its upper limit, PM deposits on the surface of partition walls. In other words, after the upper limit of the in-wall PM deposition amount is reached, the mode of deposition of PM in the SCR filter 51 shifts from in-wall PM deposition to surface PM deposition. In this process, as shown in FIG. 5, during the in-wall PM deposition period, the saturated adsorption amount of the SCR catalyst 51*a* increases in accordance with the increase in the filter PM deposition amount, namely in accordance with the increase in the in-wall PM deposition amount. On the other hand, during the surface PM deposition period, the saturated adsorption amount of the SCR catalyst 51*a* does not increase, even while the filter PM deposition amount increases, namely even while the surface PM deposition amount increases. It should be notated that the in-wall PM deposition amount is at its upper limit, during the surface PM deposition period. Therefore, during the surface PM deposition period, the saturated adsorption amount of the SCR catalyst 51*a* is constantly at the amount that is achieved when the in-wall PM deposition amount is at its upper limit. From the above, it is considered that the difference between the saturated adsorption amount of the SCR catalyst 51*a* in the state in which PM is deposited in the SCR filter 51 and that in the state in which PM is not deposited in the SCR filter 51 shown in FIG. 4 is attributable to in-wall PM deposition.

The larger the saturated adsorption amount of the SCR catalyst 51a is, the less ammonia is apt to be desorbed from the SCR catalyst 51a. Therefore, if the values of the other parameters relating to the ammonia desorption quantity are the same, namely if the filter temperature and the ammonia adsorption amount in the SCR catalyst 51a are the same, the ammonia desorption quantity is smaller when the in-wall PM deposition amount is large than when the in-wall PM deposition amount is small. Therefore, if the filter temperature and the ammonia adsorption amount in the SCR catalyst 51a are the same, the ammonia desorption quantity during the surface PM deposition period is smaller than that during the in-wall PM deposition period. For this reason, it is considered that the ammonia adsorption amount in the SCR catalyst 51a is more apt to increase during the surface PM deposition period than during the in-wall PM deposition period. Therefore, the ammonia adsorption amount in the SCR catalyst 51a is larger during the surface PM deposition period than during the in-wall PM deposition period, if the values of the other parameters relating to the increase of the ammonia adsorption amount in the SCR catalyst 51a are the same.

During the surface PM deposition period, the saturated adsorption amount of the SCR catalyst 51a does not increase even if the filter PM deposition amount increases, namely even if the surface PM deposition amount increases. Therefore, during the surface PM deposition period, the ammonia desorption quantity does not change even if the surface PM deposition amount changes, if the filter temperature and the ammonia adsorption amount in the SCR catalyst 51a remain the same. For this reason, it is considered that during the surface PM deposition period, increases or decreases in the filter PM deposition amount have little effect on increases or decreases in the ammonia adsorption amount in the SCR catalyst 51a.

(Control of Ammonia Supply Quantity)

Here, a problem that may arise when the ammonia adsorption amount in the SCR catalyst 51 increases with increases in the in-wall PM deposition amount in the SCR filter will be described. As described above, the reason why the ammonia adsorption amount in the SCR catalyst 51a increases with increases in the in-wall PM deposition amount in the SCR filter 51 is considered to be that the saturated adsorption amount of the SCR catalyst 51 increases with increases in the in-wall PM deposition amount. As shown in FIG. 4, the lower the filter temperature is, the larger the increase of the saturated adsorption amount of the SCR catalyst 51a attributable to the in-wall PM deposition (that is, the vertical difference between line L1 and line L2) is. In both the states in which PM is deposited in the SCR filter 51 and in which PM is not deposited in the SCR filter 51, the saturated adsorption amount of the SCR catalyst 51a decreases as the filter temperature increases. The decrease in the saturated adsorption amount of the SCR catalyst 51a thus caused is larger in the state in which PM is deposited in the SCR filter 51 (namely in the state in which PM is deposited in partition walls of the SCR filter 51) than in the state in which PM is not deposited in the SCR filter 51. For example, in the case where the filter temperature rises from TA to TB in FIG. 4, the saturated adsorption amount of the SCR catalyst 51a decreases by GA in the state in which PM is deposited in partition walls of the SCR filter 51, and the saturated adsorption amount of the SCR catalyst 51a decreases by GB in the state in which PM is not deposited in the SCR filter 51, where GA is larger than GB.

Figure 6:
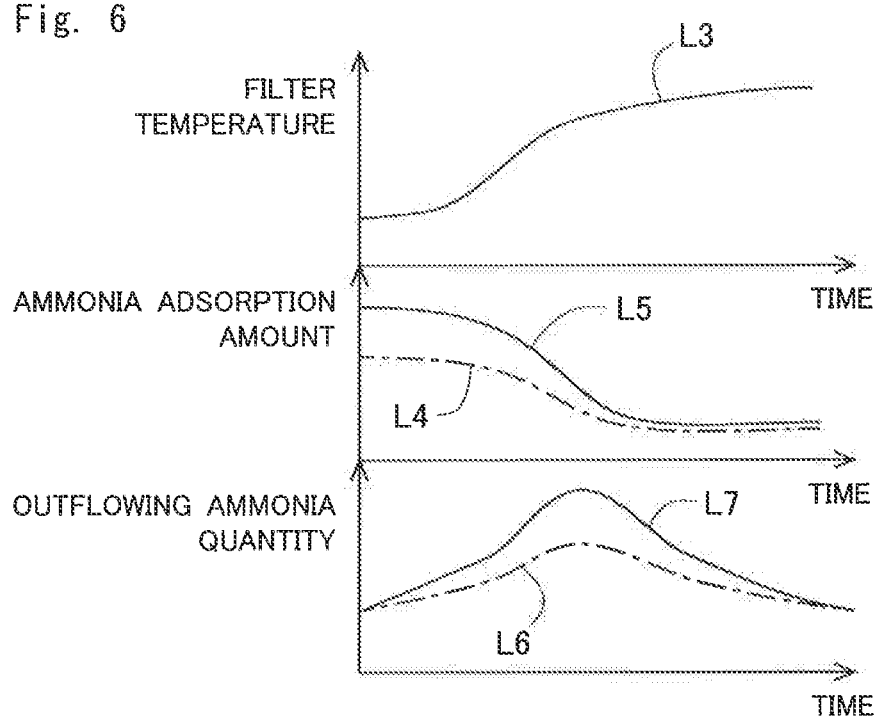
FIG. 6 is a time chart showing changes with time of the filter temperature, the ammonia adsorption amount in the SCR catalyst, and the quantity of ammonia flowing out of the SCR filter 51.

As the saturated adsorption amount of the SCR catalyst 51a decreases with increases in the filter temperature, a portion of ammonia adsorbed in the SCR catalyst 51a is desorbed, and the desorbed ammonia flows out of the SCR filter 51. The larger the decrease in the saturated adsorption amount of the SCR catalyst 51a is, the larger the quantity of ammonia thus flowing out of the SCR filter 51 (which will be hereinafter referred to as the outflowing ammonia quantity) is. FIG. 6 is a time chart showing changes with time of the filter temperature, the ammonia adsorption amount in the SCR catalyst 51a, and the quantity of ammonia flowing out of the SCR filter 51. In FIG. 6, line L3 represents the change with time of the filter temperature, which changes with changes of the operation state of the internal combustion engine 1. In FIG. 6, line L4 represents the change with time of the ammonia adsorption amount in the state in which PM is not deposited in the SCR filter 51, and line L5 represents the change with time of the ammonia adsorption amount in the state in which PM is deposited in partition walls of the SCR filter 51. In FIG. 6, line L6 represents the change with time of the outflowing ammonia quantity in the state in which PM is not deposited in the SCR filter 51, and line L7 represents the change with time of the outflowing ammonia quantity in the state in which PM is deposited in partition walls of the SCR filter 51. As shown in FIG. 6, as the filter temperature increases, the ammonia adsorption amount in the SCR catalyst 51a decreases, because ammonia is desorbed from the SCR catalyst 51a due to a decrease in the saturated adsorption amount of the SCR catalyst 51a. This decrease in the saturated adsorption amount of the SCR catalyst 51a is larger in the state in which PM is deposited in partition walls of the SCR filter 51 than in the state in which PM is not deposited in the SCR filter 51. Hence, the quantity of ammonia desorbed from the SCR catalyst 51a with an increase in the filter temperature is larger in the state in which PM is deposited in partition walls of the SCR filter 51 than in the state in which PM is not deposited in the SCR filter 51. Therefore, the decrease in the ammonia adsorption amount in the SCR catalyst 51a is larger in the state in which PM is deposited in partition walls of the SCR filter 51 than in the state in which PM is not deposited in the SCR filter 51. Thus, the quantity of ammonia flowing out of the SCR filter 51 due to an increase in the filter temperature is larger in the state in which PM is deposited in partition walls of the SCR filter 51 than in the state in which PM is not deposited in the SCR filter 51.

As above, if the saturated adsorption amount of the SCR catalyst 51a increases due to in-wall PM deposition in the SCR filter 51 and the ammonia adsorption amount in the SCR catalyst 51a exceeds the target adsorption amount consequently, there is a possibility that the quantity of ammonia flowing out of the SCR filter 51 may increase excessively, when the temperature of the SCR filter 51 increases with changes in the operation state of the internal combustion engine 1. To prevent such an excessive increase of the quantity of ammonia flowing out of the SCR filter 51 from occurring, it is necessary to control the quantity of ammonia to be supplied to the SCR filter 51 taking account of the state of deposition of PM in the SCR filter 51, thereby preventing the ammonia adsorption amount in the SCR catalyst 51a from becoming too much larger than the target adsorption amount.

To address the above problem, in the system of this embodiment, the state of deposition of PM in the SCR filter 51 is taken into account in the calculation of ammonia supply quantity by the ammonia supply quantity calculation unit 120. More specifically, the state of deposition of PM in the SCR filter 51 is taken into account in the calculation of ammonia desorption quantity by the desorption quantity calculation unit 122. Specifically, in the calculation of ammonia desorption quantity by the desorption quantity calculation unit 122, the calculated value of the ammonia desorption quantity is varied depending on whether it is during the in-wall PM deposition period or during the surface PM deposition period, even if the input values of the filter temperature and the target adsorption amount are the same. As shown in FIG. 5, the saturated adsorption amount is larger during the surface PM deposition period than during the in-wall PM deposition period. Therefore, if the other parameters relating to the ammonia desorption quantity are the same, the ammonia desorption quantity is smaller during the surface PM deposition period than during the in-wall PM deposition period. Therefore, the desorption quantity calculation unit 122 is configured to calculate the ammonia desorption quantity in such a way that the calculated value of the ammonia desorption quantity is smaller during the surface PM deposition period than during the in-wall PM deposition period, if the input values of the filter temperature and the target adsorption amount are the same. In consequence, the calculated value of the ammonia supply quantity calculated as the sum of the ammonia consumption quantity and the ammonia desorption quantity in the ammonia supply quantity calculation unit 120 is smaller in cases where the time at which ammonia is supplied to the SCR filter 51 is during the surface PM deposition period than in cases where the time at which ammonia is supplied to the SCR filter 51 is during the in-wall PM deposition period. Controlling the supply of ammonia to the SCR filter 51 with the ammonia supply quantity thus calculated can prevent the ammonia adsorption amount in the SCR catalyst 51a from becoming too much larger than the target adsorption amount during the surface PM deposition period.

Next, how the quantity of ammonia supplied to the SCR filter 51 during the surface PM deposition period is controlled will be described. As described above, the conventionally known theory is that increases in the PM deposition amount in an SCR filter make the ammonia adsorption amount in the SCR catalyst supported on that SCR filter more apt to increase. On the basis of this conventional theory, with a view to prevent the ammonia adsorption amount in the SCR catalyst 51a from becoming too much larger than the target adsorption amount, the system may be designed in such a way as to decrease the quantity of ammonia supplied to the SCR filter 51 in response to increases in the PM deposition amount (i.e. increases in the surface PM deposition amount) during the surface PM deposition period.

However, according to the above-described findings by the inventors, increases or decreases in the surface PM deposition amount in the SCR filter have little effect on the ammonia adsorption amount in the SCR catalyst. More specifically, during the surface PM deposition period, the saturated adsorption amount in the SCR catalyst 51a does not increase even when the filter PM deposition amount increases, as shown in FIG. 5. Therefore, during the surface PM deposition period, the ammonia desorption quantity does not change even if the surface PM deposition amount changes, so long as the filter temperature and the ammonia adsorption amount in the SCR catalyst 51a remain the same. Therefore, during the surface PM deposition period, if the quantity of ammonia supplied to the SCR filter 51 is decreased in response to increases in the surface PM deposition amount, there is a possibility that the ammonia adsorption amount in the SCR catalyst 51a may become too much smaller than the target adsorption amount. If the ammonia adsorption amount in the SCR catalyst 51a is too much smaller than the target adsorption amount, it is difficult to achieve a desired NOx removal rate with the SCR filter 51.

In view of the above, the system of this embodiment is designed in such a way that in the case where the time to supply ammonia to the SCR filter 51 is during the surface PM deposition period, the desorption quantity calculation unit 122 calculates the ammonia desorption quantity as a constant value, if the input values of the filter temperature and the target adsorption amount are the same. Thus, the change in the ammonia supply quantity calculated as the sum of the ammonia consumption quantity and the ammonia desorption quantity in the ammonia supply quantity calculation unit 120 relative to the change in the filter PM deposition amount is zero. Controlling the supply of ammonia to the SCR filter 51 with the ammonia supply quantity thus calculated can prevent the ammonia adsorption amount in the SCR catalyst 51a from becoming too much smaller than the target adsorption amount during the surface PM deposition period.

Figure 7:
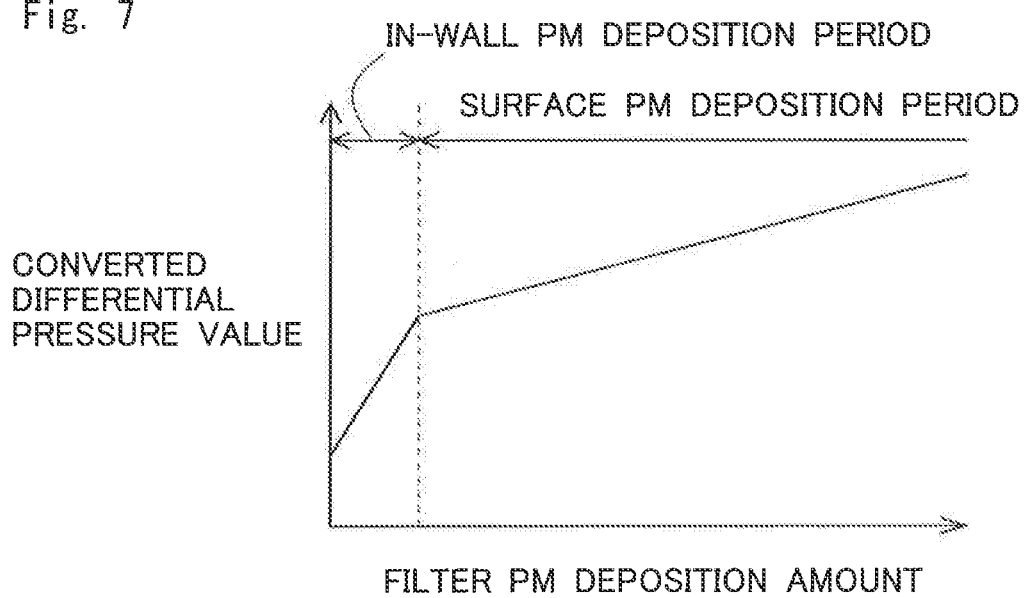
FIG. 7 is a graph showing changes in the converted differential pressure value with increases in the filter PM deposition amount.

Next, a method of making an identification between the in-wall PM deposition period and the surface PM deposition period according to the embodiment will be described with reference to FIG. 7. FIG. 7 is a graph showing changes in the converted differential pressure value with increases in the filter PM deposition amount. In FIG. 7, the horizontal axis represents the filter PM deposition amount and the vertical axis represents the converted differential pressure value.

The converted differential pressure value is a converted value of the filter differential pressure obtained by normalizing the filter differential pressure measured by the differential pressure sensor 59 by the exhaust gas flow rate. More specifically, the converted differential pressure value in this embodiment is expressed by the following equation 1:

$$Ap = dP/Qg \qquad \text{equation 1,}$$

where Ap is the converted differential pressure value, dP is the filter differential pressure (i.e. the measurement value of the differential pressure sensor 59), and Qg is the exhaust gas flow rate.

The differential pressure change rate is defined as the increase in the converted differential pressure value per unit increase in the filter PM deposition amount (i.e. the gradient of the line in FIG. 7). The differential pressure change rate is expressed by the following equation 2:

$$Rp = dAp/dQpm \qquad \text{equation 2,}$$

where Rp is the differential pressure change rate, dAp is the increase in the converted differential pressure value during a second predetermined period, and dQpm is the increase in the filter PM deposition amount during the second predetermined period. The length of the second predetermined period is determined in advance in accordance with the interval of calculation to calculate the differential pressure change rate. The values dAp and dQpm are the increase in the converted differential pressure value and the increase in the filter PM deposition amount respectively during the same second predetermined period.

As shown in FIG. 7, as the filter PM deposition amount increases, the converted differential pressure value increases. With the SCR filter 51, deposition of PM in partition walls affects the filter differential pressure more greatly than deposition of PM on the surface of partition walls. Therefore, for the same amount of increase in the PM deposition amount, the magnitude of increase in the converted differential pressure value is larger with increase in the in-wall PM deposition amount than with increase in the surface PM deposition amount. Therefore, as shown in FIG. 7, the differential pressure change rate is higher during the in-wall PM deposition period than during the surface PM deposition period. In other words, change in the mode of PM deposition in the SCR filter 51 from in-wall PM deposition to surface PM deposition causes a decrease in the differential pressure change rate. Therefore, an identification between the in-wall PM deposition period and the surface PM deposition period can be made on the basis of the differential pressure change rate. Specifically, if the differential pressure change rate is equal to or higher than a specific threshold, it may be concluded that it is during the in-wall PM deposition period. If the differential pressure change rate is lower than the specific threshold, it may be concluded that it is during the surface PM deposition period.

As described above, the mode of PM deposition in the SCR filter 51 shifts in order from in-wall PM deposition to surface PM deposition. It should be noted that oxidation of PM in the SCR filter 51 can occur both inside partition walls and on the surface of partition walls. Therefore, even after the mode of PM deposition has once shifted to surface PM deposition, the in-wall PM deposition amount may decrease due to oxidation in some cases. In such cases, when deposition of PM in the SCR filter 51 restarts, PM deposits firstly in partition walls. Then, there may be cases where the in-wall PM deposition progresses in a state in which PM remains on the surface of partition walls. Therefore, it is difficult to make an identification between the in-wall PM deposition period and the surface PM deposition period with high accuracy only on the basis of the time elapsed since the start of deposition of PM in the SCR filter 51 (e.g. the time elapsed from the end of filter regeneration process) or the filter PM deposition amount (i.e. the overall amount of PM deposited in the SCR filter 51). Using the differential pressure change rate as a parameter in making an identification between the in-wall PM deposition period and the surface PM deposition period enables more accurate identification.

(Flow of Calculation of Urea Solution Addition Quantity)

Figure 8:
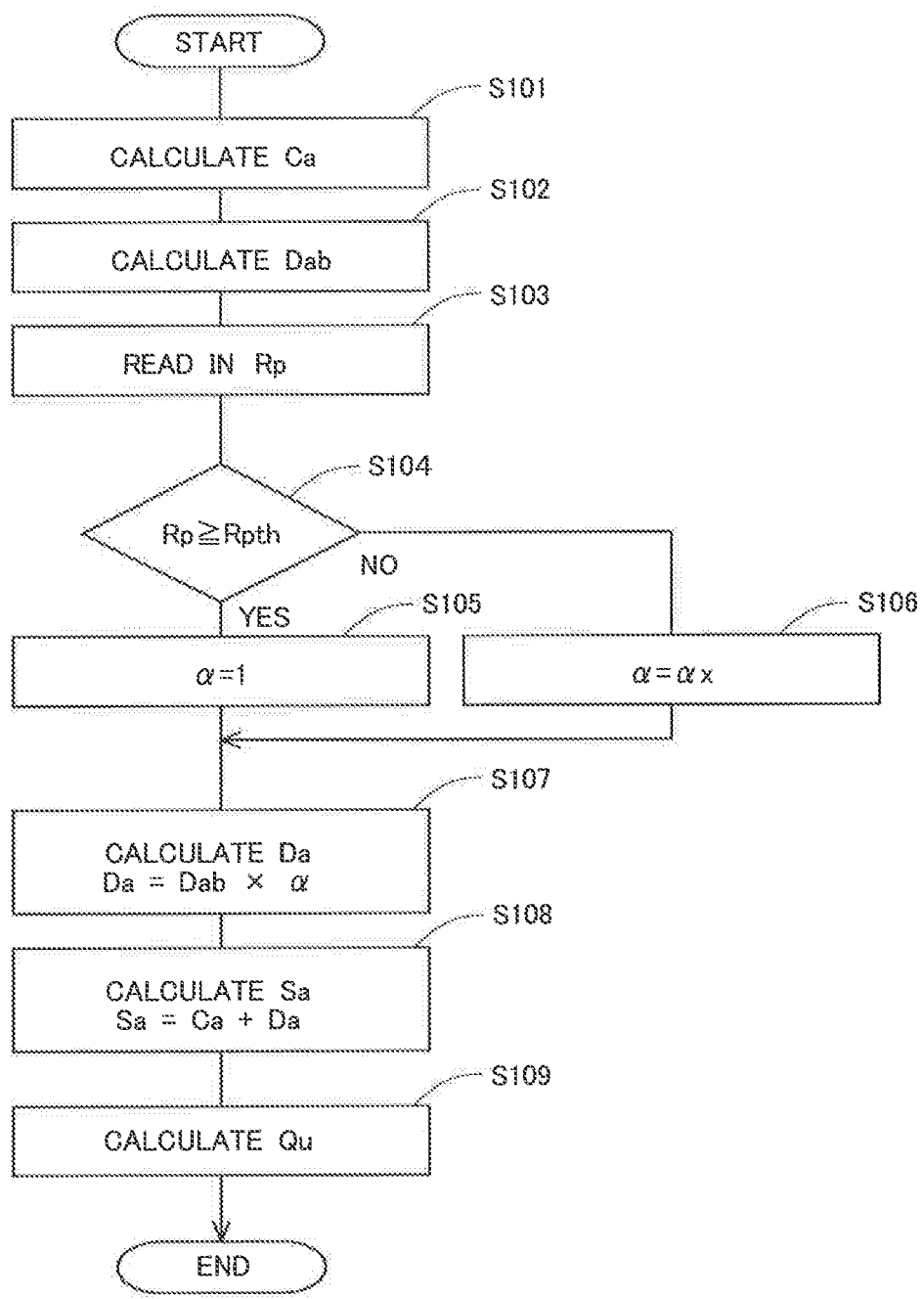
FIG. 8 is a flow chart showing a flow of a process of calculating the quantity of urea solution to be added through a urea solution addition valve according to the embodiments of the present disclosure.

Now, a flow of calculation of the quantity of urea solution to be added through the urea solution addition valve according to the embodiment will be described with reference to FIG. 8. FIG. 8 is a flow chart showing the flow of calculation of the quantity of urea solution to be added through the urea solution addition valve 53. This calculation process is executed by the ECU 10 repeatedly at a predetermined interval (the same as the aforementioned interval of calculation of the ammonia supply quantity). The length of this calculation interval is equal to or shorter than the length of the predetermined supply period.

In this flow, firstly in step S101, the ammonia consumption quantity Ca is calculated. In step S101, an estimated NOx removal rate is calculated on the basis of the target adsorption amount and the filter temperature at the present time. As described above, the target adsorption amount is determined on the basis of the operation state of the internal combustion engine 1. In step S101, moreover, the ammonia consumption quantity Ca is calculated on the basis of the estimated NOx removal rate thus calculated and the inflowing NOx quantity. The processing of step S3101 is executed by the consumption quantity calculation unit 121.

Then, in step S102, a base ammonia desorption quantity Dab is calculated. The base ammonia desorption quantity Dab is a base value of the ammonia desorption quantity, which is the ammonia desorption quantity in an assumed case where PM is not deposited in the SCR filter 51. The base ammonia desorption quantity Dab is calculated on the basis of the target adsorption amount and the filter temperature at the present time. Relationship of the filter temperature and the target adsorption amount to the base ammonia desorption quantity Dab is determined in advance by, for example, an experiment and stored in the ECU 10 as a map or function. In step S102, the base ammonia desorption quantity Dab is calculated using this map or function.

Then, in step S103, the differential pressure change rate Rp at the present time is read in. The differential pressure change rate Rp is calculated at the predetermined calculation interval using equation 2 presented above by another flow separate from this flow executed by the ECU 10. The calculated value of the differential pressure change rate Rp is memorized in the ECU 10. Therefore, the differential pressure change rate Rp memorized in the ECU 10 is updated every time the calculation is executed. Then, in step S104, it is determined whether or not the differential pressure change rate Rp read in step 3103 is equal to or higher than a predetermined threshold Rpth. The predetermined threshold Rpth is a threshold value with which a distinction between whether it is during the in-wall PM deposition period or during the surface PM deposition period at the present time is made. The predetermined threshold Rpth is determined in advance by, for example, an experiment and stored in the ECU 10.

If the determination made in step S104 is affirmative, it may be concluded that it is during the in-wall PM deposition period at the present time. In this case, the processing of step S105 is executed next. In step S105, a correction coefficient $\alpha$ to be used in calculation of the ammonia desorption quantity Da in step S107 that will be described later is set to 1. If the determination made in step S3.04 is negative, it may be concluded that it is during the surface PM deposition period at the present time. In this case, the processing of step S06 is executed next. In step S106, the correction coefficient $\alpha$ to be used in calculation of the ammonia desorption quantity Da in step S107 that will be described later is set to a specific value $\alpha x$. The specific value $\alpha x$ is a value larger than 0 and smaller than 1. The specific value $\alpha x$ is a constant value irrespective of the filter PM deposition amount at the present time. In other words, the specific value $\alpha x$ is a constant value irrespective of the surface PM deposition amount at the present time. The specific value $\alpha x$ is determined in such a way as to make the ammonia desorption quantity Da calculated in step S107 equal to the ammonia desorption quantity in an assumed case where the in-wall PM deposition amount in the SCR filter 51 is at its upper limit. The specific value $\alpha x$ as such is determined in advance by, for example, an experiment and stored in the ECU 10.

After the processing of S105 or S106, the processing of step S107 is executed. In step S107, the ammonia desorption quantity Da is calculated by multiplying the base ammonia desorption quantity Dab calculated in step S102 by the correction coefficient $\alpha$ calculated in step S105 or S106. With the correction coefficient $\alpha$ determined in the above-described manner, in the case where the determination made in step S104 is affirmative, namely in the case where it is during the in-wall PM deposition period at the present time, the intact value of the base ammonia desorption quantity Dab calculated in step S102 is used as the value of the ammonia desorption quantity Da (namely, Da=Dab). On the other hand, in the case where the determination made in step S104 is negative, namely in the case where it is during the surface PM deposition period at the present time, the value of the ammonia desorption quantity Da is made smaller than the base ammonia desorption quantity Dab calculated in step S102 by decreasing correction (namely, Da<Dab). Since the specific value αx is a constant value irrespective of the filter PM deposition amount at the present time, in the case where the determination made in step S104 is negative, namely in the case where it is during the surface PM deposition period at the present time, the change in the ammonia desorption quantity Da relative to the change in the filter PM deposition amount is zero. The processing of steps S102 through S107 is executed by the desorption quantity calculation unit 122.

Then, in step S108, the ammonia supply quantity Sa is calculated. The ammonia supply quantity Sa is calculated as the sum of the ammonia consumption quantity Ca calculated in step 3101 and the ammonia desorption quantity Da calculated in step S108. With the ammonia desorption quantity Da calculated in the above-described manner, the calculated value of the ammonia supply quantity Sa is smaller in the case where the determination made in step S104 is negative (namely, in the case where it is during the surface PM deposition period at the present time) than in the case where the determination made in step S104 is affirmative (namely, in the case where it is during the in-wall PM deposition period at the present time). With the ammonia desorption quantity Da calculated in the above-described manner, the change in the ammonia supply quantity Sa relative to the change in the filter PM deposition quantity is zero, in the case where the determination made in step S104 is negative (namely, in the case where it is during the surface PM deposition period at the present time).

Then, in step S109, the urea solution addition quantity Qu to be added through the urea solution addition valve 53 is calculated from the ammonia supply quantity Sa calculated in step S108. In this step, the quantity of urea solution to be added through the urea solution addition valve 53 over the predetermined supply period is calculated as the urea solution addition quantity Qu. The urea solution addition quantity Qu is calculated in such a way that the quantity of ammonia generated by hydrolysis of urea contained in the urea solution added through the urea solution addition valve 53 becomes equal to the ammonia supply quantity Sa calculated in step S108. The relationship between the ammonia supply quantity Sa and the urea solution addition quantity Qu can be determined in advance by, for example, an experiment. The relationship between them is stored in the ECU 10 as a map or function. In step S109, the urea solution addition quantity Qu is calculated using this map or function. The value of the urea solution addition quantity Qu calculated in step S109 is memorized in the ECU 10. Therefore the urea solution addition quantity Qu memorized in the ECU 10 is updated every time this calculation process is executed.

(Flow of Urea Solution Addition Control)

Figure 9:
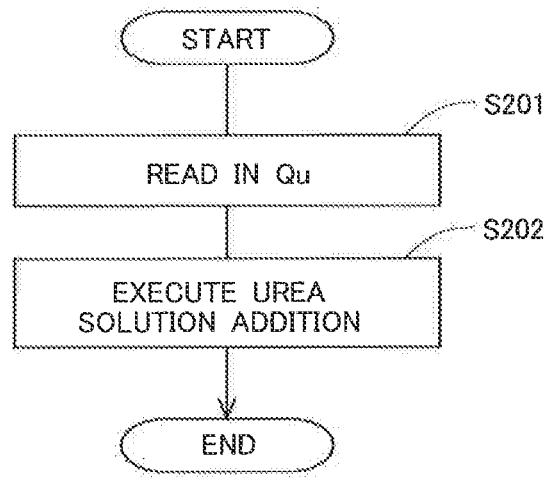
FIG. 9 is a flow chart of a flow of a process of controlling addition of urea solution through the urea solution addition valve according to the embodiments of the present disclosure.

Next, a flow of the process of controlling addition of urea solution through the urea solution addition valve according to the embodiment will be described with reference to FIG. 9. FIG. 9 is a flow chart showing the flow of the process of controlling addition of urea solution through the urea solution addition valve 53 in the system according the embodiment. This process is executed by the ECU 10 repeatedly at every predetermined supply period mentioned above.

In this flow, firstly in step S201, the urea solution addition quantity Qu calculated by the above-described flow of calculation of the urea solution addition quantity and memorized in the ECU 10 is read in. Then, in step S202, addition of urea solution through the urea solution addition valve 53 is performed in such a way that the quantity of urea solution added through the urea solution addition valve 53 over the predetermined supply period amounts to the urea solution addition quantity Qu read in step 201.

By the calculation of urea solution addition quantity and the control of urea solution addition according to the above described flows, the quantity of ammonia supplied to the SCR filter 51 is controlled to a quantity adapted to the state of deposition of PM in the SCR filter 51. Therefore, the ammonia adsorption amount in the SCR catalyst 51a can be adjusted as close as possible to the target adsorption amount.

In the above-described flow of calculation of the urea solution addition quantity, the base ammonia desorption quantity Dab is calculated beforehand, and the ammonia desorption quantity Da is calculated by multiplying the base ammonia desorption quantity Dab by the correction coefficient α determined in step S105 or S106. Alternatively, a map representing relationship of the filter temperature and the target adsorption amount to the ammonia desorption quantity Da to be used during the in-wall PM deposition period and a map representing relationship of the filter temperature and the target adsorption amount to the ammonia desorption quantity Da to be used during the surface PM deposition period may be prepared separately and stored in the ECU 10. These maps may be used selectively depending on whether it is during the in-wall PM deposition period or during the surface deposition period at the present time to calculate ammonia desorption quantities Da adapted to the respective periods. In this case, the value of the ammonia desorption quantity for the same filter temperature and target adsorption amount is smaller in the map to be used during the surface PM deposition period than in the map to be used during the in-wall PM deposition period. In the map to be used during the surface PM deposition period, the value of the ammonia desorption quantity is constant if the values of the filter temperature and the target adsorption amount are the same. By selectively using these maps in calculating the ammonia desorption quantity, the ammonia desorption quantity can be calculated appropriately, as in the case where the processing of steps S102 through S107 in the above-described flow of calculation of the urea solution addition quantity is executed.

In the above-described flow of calculation of the urea solution addition quantity, in the case where it is determined in step S104 that the differential pressure change rate Rp is equal to or higher than the predetermined threshold Rpth, namely in the case where it is during the in-wall PM deposition period at the present time, the intact value of the base ammonia desorption quantity Dab is used as the value of the ammonia desorption quantity Da irrespective of the in-wall PM deposition quantity at the present time. In consequence, in the case where it is during the in-wall PM deposition period at the present time, the ammonia supply quantity Sa is equal to the sum of the base ammonia desorption quantity Dab and the ammonia consumption quantity Ca irrespective of the in-wall PM deposition quantity at the present time. However, during the in-wall PM deposition period, the actual ammonia desorption quantity is considered to be smaller than the base ammonia desorption quantity Dab due to deposition of PM in partition walls of the SCR filter 51. Therefore, if a quantity of ammonia equal to the sum of the base ammonia desorption quantity Dab and the ammonia consumption quantity Ca is supplied to the SCR filter 51, it is considered that there is a possibility that the ammonia adsorption amount in the SCR catalyst 51a may become too much larger than the target adsorption amount.

In view of the above, during the in-wall PM deposition period also, it is preferred, theoretically, that the calculated value of the ammonia desorption quantity Da be made smaller than the base ammonia desorption quantity Dab by decreasing correction taking account of the in-wall PM deposition amount at the present time. Moreover, it is preferred that the quantity of urea solution be controlled in such a way that the quantity of ammonia supplied to the SCR filter 51 is adapted to the corrected ammonia desorption quantity. However, as described above, since oxidation of PM in the SCR filter 51 can occur both inside partition walls and on the surface of partition walls, even when the filter PM deposition amount (i.e. the overall PM deposition amount in the entirety of the SCR filter 51) is the same, the in-wall PM deposition amount is not necessarily the same. Moreover, even when the in-wall PM deposition amount is the same, the converted differential pressure value varies, if the surface PM deposition amount varies. Therefore, it is difficult to precisely determine the in-wall PM deposition amount during the in-wall PM deposition period on the basis of the filter PM deposition amount and the converted differential pressure value. For this reason, in this embodiment, in the case where it is during the in-wall PM deposition period at the present time, the intact value of the base ammonia desorption quantity Dab is used as the value of the ammonia desorption quantity Da. In general, the in-wall PM deposition period is much shorter than the surface PM deposition period. Therefore, even if the actual ammonia adsorption amount in the SCR catalyst 51a during the in-wall PM deposition period is increased from the target adsorption amount by the effect of the in-wall PM deposition, substantial problems might rarely arise.

In the case where it is during the in-wall PM deposition period at the present time, it is not essential that the intact value of the base ammonia desorption quantity Dab be used as the value of the ammonia desorption quantity Da. For example, an assumption that the in-wall PM deposition amount changes to some extent during the in-wall PM deposition period may be made in advance, and the value of the ammonia desorption quantity Da may be calculated by decreasing correction of the base ammonia desorption quantity Dab on the basis of this assumption. In this case, it is preferred that the calculated value of the ammonia desorption quantity Da be made smaller when the assumed in-wall PM deposition amount is large than when the assumed in-wall PM deposition amount is small. In other words, it is preferred that the calculated value of the ammonia supply quantity Sa be made smaller when the assumed in-wall PM deposition amount is large than when the assumed in-wall PM deposition amount is small. Even in the case where the ammonia desorption quantity Da during the in-wall PM deposition period is calculated in this way, the calculated value of the ammonia desorption quantity Da is larger than the value of the ammonia desorption quantity Da during the surface PM deposition period at the same filter temperature and the same target adsorption amount. In other words, if the inflowing NOx quantity, the filter temperature, and the target adsorption amount are the same, the ammonia supply quantity Sa during the in-wall PM deposition period is larger than the ammonia supply quantity Sa during the surface PM deposition period.

In this embodiment, the SCR filter 51 corresponds to the SCR filter according to the present disclosure, and the urea solution addition valve 53 corresponds to the ammonia supplier according to the present invention. In this embodiment, the execution of the processing in the flow of calculation of the urea solution addition quantity shown in FIG. 8 and the flow of the urea solution addition control shown in FIG. 9 embodies the controller according to the present disclosure.

(First Modification)

As shown in FIG. 4, if the filter temperature is the same, the saturated adsorption amount of the SCR catalyst 51a is larger in the state in which PM is deposited in the SCR filter 51 than in the state in which PM is not deposited in the SCR fitter 51. As described above, such a variation in the saturated adsorption amount of the SCR catalyst 51a is not attributable to surface PM deposition but to in-wall PM deposition. As shown in FIG. 4, the lower the filter temperature is, the larger the magnitude of increase in the saturated adsorption amount of the SCR catalyst 51a attributable to the in-wall PM deposition is. Therefore, even during the surface PM deposition period, during which the in-wall PM deposition amount is constantly at its upper limit, if the ammonia adsorption amount in the SCR catalyst 51a is the same, the lower the filter temperature is, the larger the magnitude of decrease in the ammonia desorption quantity attributable to in-wall PM deposition is. Therefore, the lower the temperature of the SCR filter 51 is, the larger the magnitude of increase in the ammonia adsorption amount in the SCR catalyst 51a attributable to deposition of PM in partition walls of the SCR filter 51 is.

Figure 10:
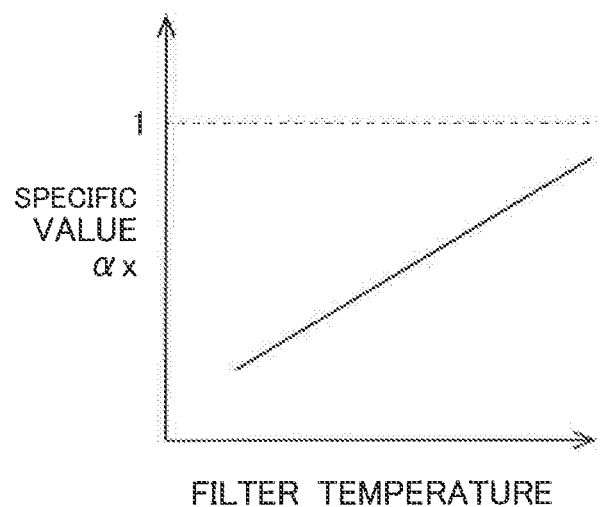
FIG. 10 is a graph showing relationship between the filter temperature and a specific value $\alpha x$ according to a first modification of the embodiments of the present disclosure.

Therefore, in the embodiment, the specific value αx that is determined as the value of the correction coefficient α in step S106 in the flow of calculation of the urea solution addition quantity shown in FIG. 8 may be varied according to the filter temperature input to the desorption quantity calculation unit 122. FIG. 10 is a graph showing relationship between the filter temperature and the specific value αx. As shown in FIG. 10, the specific value αx may be made smaller when the filter temperature is low than when the filter temperature is high. This improves the accuracy of calculation of the ammonia desorption quantity Da in the case where the differential pressure change rate Rp at the time to supply ammonia to the SCR filter 51 is lower than the predetermined threshold Rpth, namely during the surface PM deposition period. Therefore, the ammonia adsorption amount in the SCR catalyst 51a during the surface PM deposition period can be adjusted to the target adsorption amount with improved precision.

(Second Modification)

In the system according to the embodiment, the desorption quantity calculation unit 122 in the ammonia supply quantity calculation unit 120 may be configured to calculate the ammonia desorption quantity by the following calculation method. If the SCR catalyst 51a is in an equilibrium state in which the rate of adsorption of ammonia and the rate of desorption of ammonia are equal, the relationship between the ammonia adsorption amount in the SCR catalyst 51a and the ammonia desorption quantity can be expressed by the following equation 3 according to the Langmuir adsorption isotherm equation:

$$AD = \frac{K \times Da}{1 + K \times Da} \times \sigma, \quad \text{equation 3}$$

where AD is the ammonia adsorption amount in the SCR catalyst 51a, Da is the ammonia desorption quantity, σ is the saturated ammonia adsorption amount of the SCR catalyst 51a, and K is an equilibrium constant.

The above equation 3 can be transformed into the following equation 4, which can be used as an equation for calculating the ammonia desorption quantity:

$$Da = \frac{AD}{K \times \sigma \times \left(1 - \frac{1}{\sigma} \times AD\right)}. \qquad \text{equation 4}$$

The saturated ammonia adsorption amount σ in the SCR catalyst 51$a$ and the equilibrium constant K vary depending on the filter temperature. Specifically, as shown in FIG. 4, the higher the filter temperature is, the smaller the saturated adsorption amount σ of the SCR catalyst 51$a$ is. Moreover, the higher the filter temperature is, the smaller the equilibrium constant K is.

As described above, even if the filter temperature is the same, the saturated adsorption amount of the SCR catalyst 51$a$ varies depending on whether it is during the in-wall PM deposition period or during the surface PM deposition period. Therefore, the desorption quantity calculation unit 122 may be configured to calculate the ammonia desorption quantity by the following equation 5, which is based on the above equation 4.

$$Da = \frac{ADt}{K \times (\sigma_0 \times \beta) \times \left(1 - \frac{1}{(\sigma_0 \times \beta)} \times ADt\right)}, \qquad \text{equation 5}$$

where ADt is the target ammonia adsorption amount, Da is the ammonia desorption quantity, $\sigma_0$ is the saturated ammonia adsorption amount of the SCR catalyst 51$a$ in an assumed case where PM is not deposited in the SCR filter, K is an equilibrium constant, and β is a correction coefficient.

The saturated adsorption amount $\sigma_0$ of the SCR catalyst 51$a$ and the equilibrium constant K in the above equation 5 are determined on the basis of the value of the filter temperature input to the desorption quantity calculation unit 122. The correction coefficient β in the above equation 5 is determined on the basis of the differential pressure change rate Rp at the time when the ammonia desorption quantity is calculated (or the differential pressure change rate at the time when ammonia is supplied to the SCR filter 51) as follows:

when $Rp \geq Rpth, \beta = 1$, when $Rp < Rpth, \beta = \beta x$.

As above, when Rp<Rpth, the correction coefficient β is set to a specific value βx. This specific value βx is larger than 1. The specific value βx is a constant value irrespective of the filter PM deposition amount.

The saturated adsorption amount $\sigma_0$ of the SCR catalyst 51$a$ is corrected by the correction coefficient β determined as above. Therefore, according to the above equation 5, even if the equilibrium constant K and the saturated adsorption amount $\sigma_0$ are the same because of the same filter temperature and the target adsorption amount Adt is also the same, the ammonia desorption quantity Da is calculated as a smaller value during the surface PM deposition period (when β=βx>1) than during the in-wall PM deposition period (when β=1). During the surface PM deposition period, since the correction coefficient β is set to the specific value βx, which is constant irrespective of the filter PM deposition amount, the ammonia desorption quantity Da is calculated as a constant value irrespective of the filter PM deposition amount, so long as the filter temperature and the target adsorption amount Adt remain the same.

Therefore, in the case where the desorption quantity calculation unit 122 calculates the ammonia desorption quantity using the above equation 5 also, the ammonia desorption quantity can be calculated appropriately, as in the case where the processing of steps S102 through S107 in the above-described flow of calculation of the urea solution addition quantity shown in FIG. 8 is executed. Therefore, in the case where the processing of steps S102 through S107 in the flow of calculation of the urea solution addition quantity shown in FIG. 8 is replaced by the processing of calculating the ammonia desorption quantity Da using the above equation 5, the advantageous effects described above can also be enjoyed.

As with the specific value αx in the above-described first modification 1, the specific value βx may be varied depending on the filter temperature. Specifically, the specific value βx may be set larger when the filter temperature is low than when the filter temperature is high. This improves the accuracy of calculation of the ammonia desorption quantity Da in the case where the differential pressure change rate Rp at the time to supply ammonia to the SCR filter 51 is lower than the predetermined threshold Rpth, namely during the surface PM deposition period, as in the first modification. Therefore, the ammonia adsorption amount in the SCR catalyst 51$a$ during the surface PM deposition period can be adjusted to the target adsorption amount with improved precision.

What is claimed is:

1. An exhaust gas purification system for an internal combustion engine comprising:
    a selective catalytic reduction (SCR) filter provided in an exhaust passage of an internal combustion engine including a filter and an SCR catalyst supported on said filter, said SCR catalyst having a capability of reducing NOx in exhaust gas by using ammonia as reducing agent, and said filter having a function of trapping particulate matter in exhaust gas;
    an ammonia supply device provided in the exhaust passage to supply ammonia to said SCR filter; and
    a controller comprising at least one processor configured to control the quantity of ammonia supplied by said ammonia supplier so as to adjust the ammonia adsorption amount in said SCR catalyst to a target adsorption amount,
    wherein said controller is configured to make the quantity of ammonia supplied by said ammonia supply device smaller when a differential pressure change rate at the time when ammonia is supplied by said ammonia supply device is lower than a predetermined threshold than when said differential pressure change rate at the time when ammonia is supplied by said ammonia supply device is equal to or larger than said predetermined threshold and the controller is configured to control the quantity of ammonia supplied by said ammonia supply device in such a way that the change in the quantity of ammonia supplied by said ammonia supply device relative to the change in a filter particulate matter deposition amount is zero when said differential pressure change rate is lower than said predetermined threshold, said differential pressure change rate being defined as the amount of increase in a converted differential pressure value per unit increase in said filter particular matter deposition amount, said converted differential pressure value being obtained by normalizing the differential pressure of the exhaust gas across said SCR filter by the exhaust gas rate, said filter particulate matter deposition amount being defined as the amount of particulate matter deposited in said SCR filter that is estimated on the basis of a parameter other than said converted differential pressure value, and said predetermined threshold of the differential pressure change rate corresponding to a level of the amount of particulate matter deposition below which the particulate matter is deposited in partition walls of the SCR filter, and above which the particulate is deposited on a surface of the partition walls.

\* \* \* \* \*